United States Patent
Bowron et al.

(10) Patent No.: US 12,346,015 B2
(45) Date of Patent: Jul. 1, 2025

(54) METHODS AND SYSTEMS FOR CONTROLLING LIGHT OUTPUT BASED ON A LIGHT LEVEL THRESHOLD AT A BOUNDARY

(71) Applicant: IMAX Corporation, Mississauga (CA)

(72) Inventors: John William Bowron, Burlington (CA); Paul Constantinou, Burlington (CA); Anton Leonard Baljet, Seguin (CA)

(73) Assignee: IMAX CORPORATION, Mississauga (CA)

( * ) Notice: Subject to any disclaimer, the term of this patent is extended or adjusted under 35 U.S.C. 154(b) by 66 days.

(21) Appl. No.: 18/040,948

(22) PCT Filed: Aug. 6, 2021

(86) PCT No.: PCT/IB2021/057285
§ 371 (c)(1),
(2) Date: Feb. 7, 2023

(87) PCT Pub. No.: WO2022/034460
PCT Pub. Date: Feb. 17, 2022

(65) Prior Publication Data
US 2023/0314924 A1    Oct. 5, 2023

Related U.S. Application Data

(60) Provisional application No. 63/064,649, filed on Aug. 12, 2020.

(51) Int. Cl.
*F04D 27/00* (2006.01)
*F04D 13/06* (2006.01)
(Continued)

(52) U.S. Cl.
CPC ..... *G03B 21/2053* (2013.01); *G03B 21/2033* (2013.01); *H05B 47/11* (2020.01)

(58) Field of Classification Search
CPC .. G03B 21/2033; G03B 29/00; G03B 17/561; G03B 17/48; G03B 21/001; G03B 17/38;
(Continued)

(56) References Cited

U.S. PATENT DOCUMENTS

| 6,002,585 A | 12/1999 | Leeb |
| 6,984,039 B2 | 1/2006 | Agostinelli |

(Continued)

FOREIGN PATENT DOCUMENTS

| JP | 2000267621 A | 9/2000 |
| JP | 2005043868 A | 2/2005 |

(Continued)

OTHER PUBLICATIONS

International Patent Application No. PCT/IB2021/057285, "International Search Report and Written Opinion", mailed Nov. 16, 2021, 14 pages.

(Continued)

*Primary Examiner* — Monica C King
(74) *Attorney, Agent, or Firm* — Kilpatrick Townsend & Stockton LLP

(57) ABSTRACT

A system may include a projector subsystem in a theatre projecting fight toward a screen, a sensor measuring light levels of the projected light, and a processing device. The projector subsystem may project light such that there is a hazardous light area and a non-hazardous light area of an audience seating area. The processing device may receive a measured light level of projected light from the sensor. The processing device may determine a second light level between the hazardous light area and the non-hazardous light area based on the measured light level and the position (Continued)

of the light projected over the audience seating area. The processing device may compare the second light level to an unsafe threshold light level. The processing device may determine a configuration for the system such that the light level of projected light in the non-hazardous light area is less than the unsafe threshold light level.

31 Claims, 4 Drawing Sheets

(51) Int. Cl.
  *F04D 19/00* (2006.01)
  *F04D 25/06* (2006.01)
  *F04D 25/08* (2006.01)
  *G03B 21/20* (2006.01)
  *G05B 15/02* (2006.01)
  *G08C 17/02* (2006.01)
  *H05B 47/11* (2020.01)

(58) Field of Classification Search
  CPC ........ G03B 30/00; G03B 33/06; G03B 11/00; G03B 13/02; G03B 13/20; G03B 15/03; G03B 17/00; G03B 17/02; G03B 17/08; G03B 17/12; G03B 17/54; G03B 17/56; G03B 17/563; G03B 19/22; G03B 21/00; G03B 21/005; G03B 21/142; G03B 21/20; G03B 21/2013; G03B 21/28; G03B 2206/00; G03B 2213/025; G03B 23/04; G03B 27/42; G03B 33/10; G03B 35/20; G03B 37/02; H05B 47/19; H05B 47/115; H05B 47/11; H05B 47/105; H05B 45/20; H05B 47/175; H05B 47/10; H05B 47/16; H05B 45/10; H05B 47/1965; H05B 47/1975; H05B 47/125; H05B 47/12; H05B 47/13; H05B 47/196; H05B 47/197; H05B 47/199; H05B 33/14; H05B 47/155; H05B 47/17; H05B 45/12; H05B 45/22; H05B 45/50; H05B 47/165; H05B 1/0275; H05B 41/3922; H05B 45/14; H05B 45/24; H05B 45/28; H05B 47/14; H05B 47/18; H05B 47/195; H05B 47/1995; H05B 1/0202; H05B 1/028; H05B 31/50; H05B 33/22; H05B 39/088; H05B 45/00; H05B 45/32; H05B 45/325; H05B 45/48; H05B 47/00
  See application file for complete search history.

(56) References Cited

U.S. PATENT DOCUMENTS

| | | | |
|---|---|---|---|
| 8,290,208 | B2 | 10/2012 | Kurtz et al. |
| 2005/0024595 | A1 | 2/2005 | Suzuki |
| 2009/0066920 | A1* | 3/2009 | Yamagishi ......... G03B 21/2066 353/38 |
| 2024/0139360 | A1* | 5/2024 | Wendt .................. H05B 47/115 |

FOREIGN PATENT DOCUMENTS

| | | |
|---|---|---|
| JP | 2013537589 A | 10/2013 |
| JP | 2015059972 A | 3/2015 |
| WO | 2013080193 A2 | 6/2013 |
| WO | 2019222270 A2 | 11/2019 |

OTHER PUBLICATIONS

Japanese Patent Application No. 2023-509549, Office Action mailed Apr. 15, 2025, 9 pages (including English translation).

* cited by examiner

METHODS AND SYSTEMS FOR CONTROLLING LIGHT OUTPUT BASED ON A LIGHT LEVEL THRESHOLD AT A BOUNDARY

TECHNICAL FIELD

The present disclosure relates to controlling light output of a projector, and particularly (but not necessarily exclusively) to controlling light output based on a light level threshold at a boundary.

BACKGROUND

Premium cinema theatres are increasingly turning to projection systems that have a light source that provides laser light to achieve improved displayed image quality. However, portions of the projected light path can have high radiance and irradiance levels of visible light that can potentially pose a light level exposure hazard to a person's eye.

Often, existing theatres have a projected light path that is positioned low enough that the projected light could be viewed directly by a theatre patron. Such theatres can convert their projection equipment to a projection system with a brighter light source. Or, theatres can be converted such that a portion of the light in the projected light path contains a higher level of light than the previous projection system. Theatres upgrading their projectors may determine that a barrier may need to be installed to keep patrons outside the area with a light level that is known to be an exposure hazard.

Laser projectors can include laser light sources, or other types of high power light sources, that can have a significant amount of reserve capacity to allow the laser projector to be used in a range of screen sizes. The reserve capacity can also allow the laser projector to compensate for degrading laser diodes. The amount of reserve capacity of output light can be significantly more than what is involved in projecting at a light level for a small screen size. Reserve light output capacity can be utilized to compensate for changes in optical efficiency over time. For example, reserve light output capacity can be utilized to compensate for light loss due to screen gain degradation (e.g., caused by dust accumulating or contamination on the screen surface) and degrading of optical coatings over time.

In some examples, theatre areas in which the lower portion of the projected light path has a light level that is an exposure hazard for a human eye may utilize a structure to prevent a theatre patron from accessing the hazardous portion of the projected light path. The structure position may be based on a maximum light the projector is capable of projecting.

In some examples involving projectors that have light sources with a considerable amount of reserve output light capacity, the structure may be positioned farther into the theatre than would otherwise be needed for typically projected light levels. But, the farther into the theatre the structure extends, the more theatre seats are disabled. More disabled seats corresponds to a reduction in revenue.

DETAILED DESCRIPTION

Figure 1:
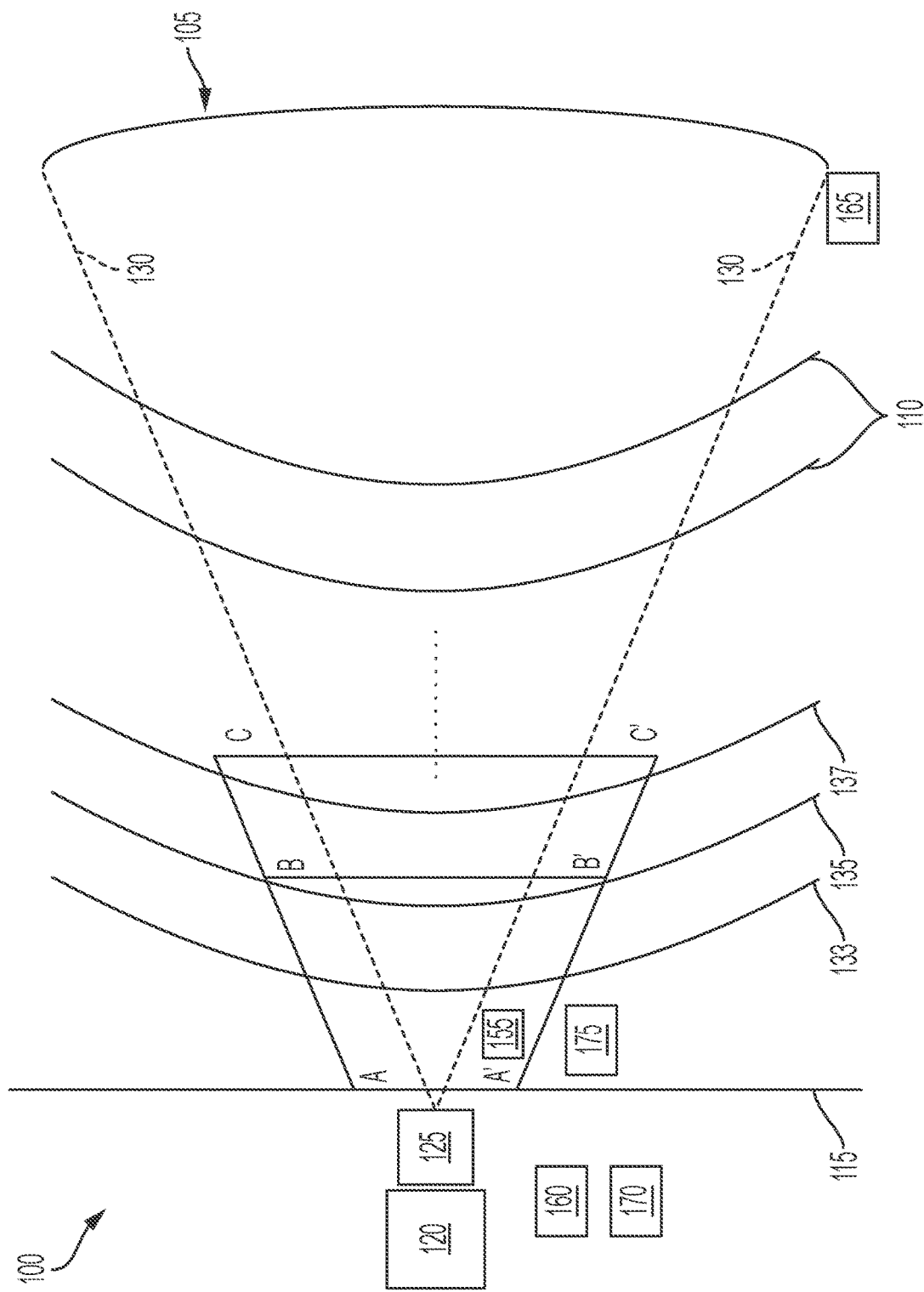
FIG. 1 is a schematic of an example of a configuration for addressing the light level hazard for an eye according to one aspect of the present disclosure.

Certain aspects and examples of the present disclosure relate to determining adjustments to a light level of projected light from a projector subsystem with a high power light source in a theatre based on light levels measured by sensors. The projector subsystem can include a projector for projecting light towards a screen in the theatre. The theatre can have a structure between a hazardous light area and a non-hazardous light area in which an audience-seating area is located. The hazardous light area can correspond to an area of the theatre where the light level of projected light is harmful to an eye of a viewer, and the non-hazardous light area can correspond to an area where the light level of projected light is not harmful to an eye of a viewer. Light levels harmful to an eye can be defined in standards for light sources such as laser light sources. For example, standards such as IEC 62471 and IEC 60825 can be used to define hazardous light level conditions of very bright light sources. A sensor can measure the light level of the light projected toward the screen. The measured light level can represent what the viewer would see of the projected light. A second light level between the hazardous light area and the non-hazardous light area can be determined based on the light level measured by the sensor and the position of the structure. The measured light level can be compared to a performance threshold light level that is based on a target light level for the viewer of the screen. Additionally, the second light level can be compared to an unsafe threshold light level. Based on the comparisons, configurations for the projector can be determined for projecting light at a light level into the non-hazardous light area that is less than the unsafe threshold light level. For example, the light level of light projected by the projector can be increased if the second light level is less than the unsafe threshold light level.

High light level projectors can project light towards a screen at light levels that can result in damage to an eye when looking directly at the point of projection within a certain distance from the point of projection. Existing theatres can convert projectors to projectors with brighter light sources that have a low projected light path in which there is a risk of directly viewing projected light.

Any portion of the projected light path that has a light level that can be hazardous to the eye is referred to as the light hazard zone. The light hazard zone can reflect a worst-case situation in which the projector light output reaches its maximum. The maximum light output can take into consideration the projector light output reserve capacity. As a result of several factors, the amount of reserve light output capacity can be very large.

Reserve capacity can be used to compensate for reduced light output as a result of a light source degrading over time. For example, degrading laser diodes used in laser projectors can be compensated for laser diode degradation. The degradation can be between 5% and 30% over the life of the laser diodes before the laser diodes should be replaced to maintain target image brightness. Reserve light output capacity can also compensate for screen degradation in which screen gain is reduced over time as result of dust or other contaminants on the screen. The compensation needed for screen degradation may be in the order of a percent or a few percent per year.

Reserve capacity can also be used in configuring the projector to suit a range of screen sizes (and subsequently various sized theatre auditoriums), For example, screens sizes can range from approximately 60-feet wide to approximately 90-feet wide. The projector configuration can be set with a specific light source size suitable for a range of smaller theatres with smaller screen sizes, or the projector can be configured with a higher optical power light source for a range of larger screens used in larger theatre auditoriums. In some examples, the reserve light output capacity of the projector light source can be greater than 20% or greater than 50%. For example, when a projector is configured with a light source with an optical power suitable for use with a smaller screen width range, the reserve light output capacity of the projector light source can reach or exceed 50% of what is needed for the smaller screen size of the projectors' light output range. The light output required for a projector can be based on the screen size. For instance, a 70 ft, wide screen would have a screen area that is about 36% larger than the area of a 60 ft. wide screen. Thus, the 70 ft. wide screen would require a projector with at least a light output that is 36% greater in optical power than the 60 ft wide screen.

The projector can also involve reserve light output capacity for light source degradation (e.g., laser diode degradation) and screen degradation at the upper end of its screen size projection capability. For example, a projector may be configured with an extra 5% reserve capacity for light source degradation and an extra 5% for screen degradation for a projector configured to work with a 70 ft. wide screen. With these parameters, the projection light output reserve capacity could reach 50% of the amount of light output needed for projecting with a new projector onto a new screen that is 60 ft. wide.

The projector can also be fitted with a projection lens that is a zoom lens. The zoom lens can allow altering of the projection angle for a wider projection with a larger field of view (FOV) from the point of projection. Alternatively, the zoom lens can allow altering of the projection angle for a narrower projection angle for a narrower projection that has a smaller FOV from the point of projection.

A projector can be adjusted such that the light source distribution across the light projection path directs more light to a portion of the cross-sectional area of the projected light path. The adjustments may result in more light or less light being directed to a portion of the light path in an area that is accessible to the viewer. More light directed to the portion of the light path in an area that is accessible to the viewer can create a light level exposure hazard for the viewer.

Alternatively, the light level for a portion of the projected light path can be modified by changing the pulse width modulation of the portion of pixels of a spatial light modulator that correspond with the portion of the light path to have a greater or lower light level. Changing the pulse width modulation may lower the light level in the portion of the projected light path that is accessible by a viewer.

FIG. 1 is a schematic of an example of a configuration 100 for addressing the light level hazard for an eye according to one aspect of the present disclosure. The configuration 100 can be a cinema auditorium 165 with a screen 105 to display image content. A projector 120 and projection lens 125 in a projection booth 160 can project the image content. There can be a barrier 115 between the projection booth 160 and the cinema auditorium 165.

The theatre can have raked seating in which rows of seats further from the screen are on raised platforms that build up in height toward the point of projection. Examples of the rows of seats can be seat platform levels 110, 133, 135 and 137. There can be a projected light path horizontal boundary 130 between the point of projection and the screen 105. A first light hazard zone limit in the projection light path can be indicated by a first limit along line B-B'. The first light hazard zone could be the area enclosed within the lines B-B', the projected light path horizontal boundary 130, and the barrier 115. A second light hazard zone limit in the projection light path can be indicated by a first limit along line C-C', The second light hazard zone could be the area enclosed within lines C-C', the projected light path horizontal boundary 130, and the barrier 115. The first and the second hazard zone can have a buffer zone on each side. For example, the first light hazard zone can include a first buffer zone with boundaries A-B, B-B', B'-A', and A'-A. The second light hazard zone can include a second buffer zone with boundaries A-C, C-C', C'-A' and A'-A.

Figure 2:
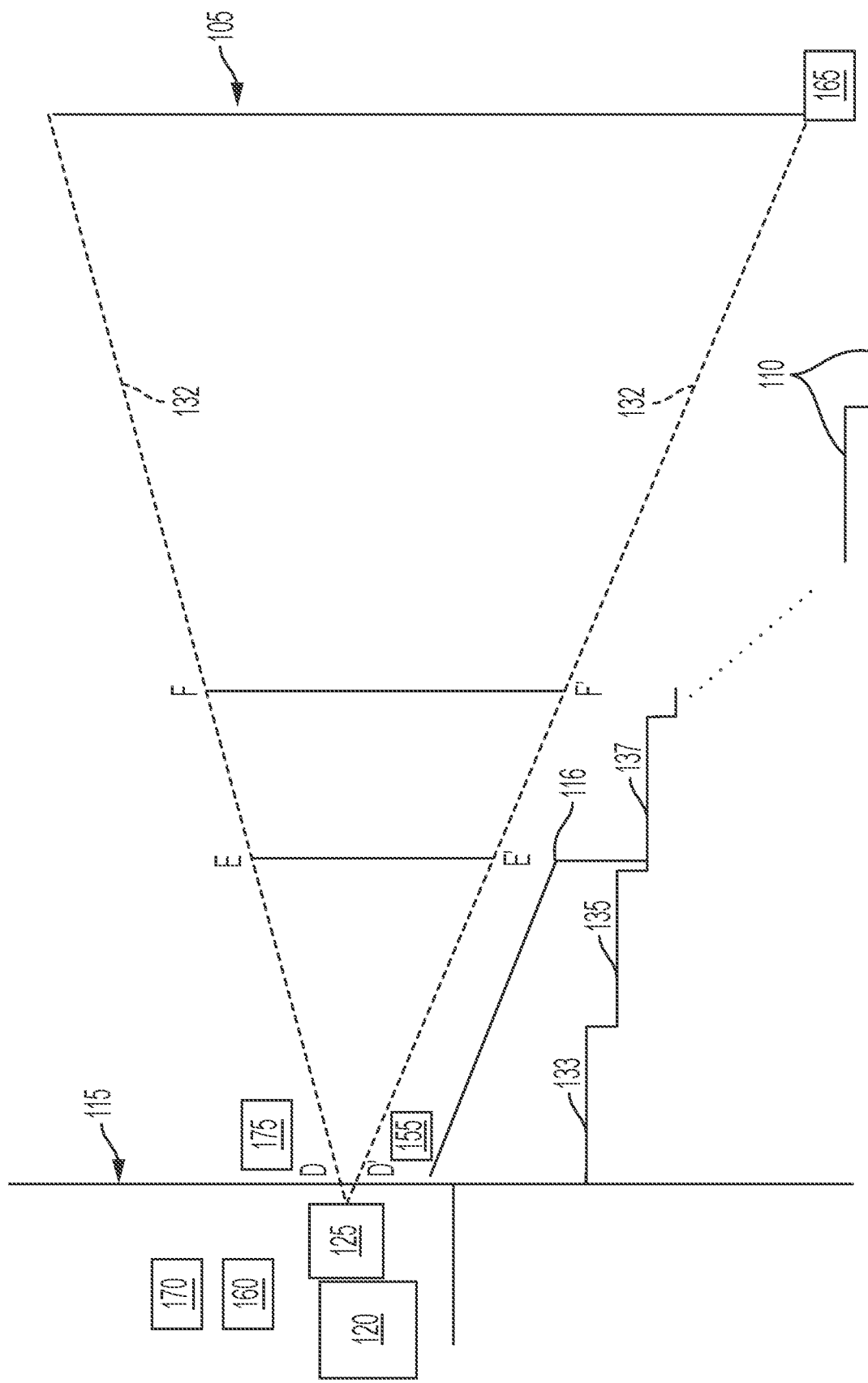
FIG. 2 is a section view of an example of a configuration including a screen for displaying image content according to one aspect of the present disclosure.

FIG. 2 is a section view of an example of the configuration 100 including the screen 105 for displaying image content according to one aspect of the present disclosure. A projected light path vertical boundary 132 can be between the point of projection and the screen 105. A first cross-sectional area of the first light hazard zone in the projection light path can have boundaries D-E, E-E', E'-D' and D'-D. A second cross-sectional area of the second light hazard zone in the projection light path have boundaries D-F, F-F', F'-D' and D'-D.

Theatres in which a theatre patron is at risk of being able to position their eye within a light hazard zone may have a structure placed at the light hazard zone boundary to prevent entry into the light hazard zone. Since a structure would impede the display view of theater patrons sitting next to the structure, the structure can be positioned at the buffer zone boundary. For example, configuration 100 can have a structure 116 positioned below the first light hazard zone boundary A perimeter of the structure 116 can correspond with the area outlined by boundaries A-C, C-C', C'-A' and A'-A shown in FIG. 1.

The light hazard zone can be defined according to several factors. For instance, a maximum light level that the projector 120 can output through the projection lens 125 can impact a size of the light hazard zone. For example, the second light hazard zone in FIGS. 1 and 2 can correspond to the area of hazardous light when the projector 120 is displaying the maximum white light for image content that is high in white light content (e.g., snow scenes or white clouds).

In some examples, the projector 120 can be a laser projector with a significant amount of reserve light output capacity that can produce a very high maximum white light levels. This can result in the second light hazard zone being extended several seat rows out from the point of projection and require a significant number of viewing seats being disabled. A maximum level of light can take into consideration image content high in white light.

Other considerations for defining the light hazard zone can be a wavelength, a bandwidth, and thermal exposure of the light sources. Some light sources, such as laser light sources or other types of high power light sources, can have a narrow light spectrum associated with each of the primary colors used for projection systems. As a result, the light source can have an increased risk of being a light hazard for the human eye. Additionally, wavelengths of blue light have a higher photochemical exposure risk to the human eye than wavelengths of green and red light sources.

Dust or contamination on the screen 105 can also impact the amount of required projected light. Dust and contamination can reduce the reflectivity characteristics of the screen 105 over time. High gain screens are screens with an angular reflective characteristic in which incident light is reflected over a narrower angle. The narrow angle reflection characteristic of a high gain screen results in more of the incident light on the screen being redirected back towards the audience. Alternatively, diffuse screens reflect incident light over broad angles. Screen gain can boost the image brightness over the narrower reflective angle between the observer and the projected image on the screen by a factor of three or more. But, the screen gain can be more susceptible to contamination by dust or other particles. To compensate for loss of screen gain the projector light source can allow the projector 120 to output more projected light to compensate for such losses.

In some examples, the second light hazard zone in FIGS. 1 and 2 can represent the light hazard zone when the projector 120 is set to output the maximum full white light. In such examples, the first light hazard zone can represent a light hazard zone associated with a typical light level or a targeted performance light level of the displayed image on the screen 105 when viewed by a theatre patron. The projected light can be within the targeted performance light level and have an associated light hazard zone that is the first hazard zone. The associated light hazard zone that is the first light hazard zone may be increased to account for increased projected light levels that compensate for screen dusting over time.

A light sensor 155 or an image sensor measure the light level of the image content on the screen 105. The light level may be set to the targeted performance light level. The targeted performance light level can be below an unsafe threshold light level at the light hazard boundary E-E'. The unsafe threshold light level can be the light level considered to be hazardous to the eye when viewing the light directly from the projector 120. The light sensor 155 can be aimed at the screen 105 to capture an image or a light level.

In some examples, the light sensor 155 may measure the light level related to the portion of the projected light that is accessible by a viewer. In other examples, the light sensor 155 may measure the light level related to the portion of the projected light that is below a certain height above the floor in the seating area. Alternatively, the light sensor 155 may measure the light level related to the projected light on the screen 105. When the hazardous area of the light path is a certain height above the floor, a structure to limit access to the space under the hazardous portion of the projected light path may not be required. For example, if the height of the hazardous portion of the projected light path above the floor in the seating area is greater than 2.5 meters or 3 meters, placing a structure in position to limit access to the area under the hazardous portion of the projected light path may not be necessary.

In some examples, the projector 120 may be configured to project light such that the light level in the portion of the projected light path that is accessible by a viewer is kept under the unsafe threshold light level. This may allow light levels above the portion of the projection light path that is accessible by a viewer to be at light levels that are above a safe threshold light level.

In another example, the projector 120 may project light such that the light level in the portion of the projected light path that is within a certain distance, such as 3 meters or less, of the seating area floor beneath the projection light path is below the unsafe threshold light level. This may allow light levels above the portion of the projected light path that is above the certain distance to be above a safe threshold level.

Figure 3:
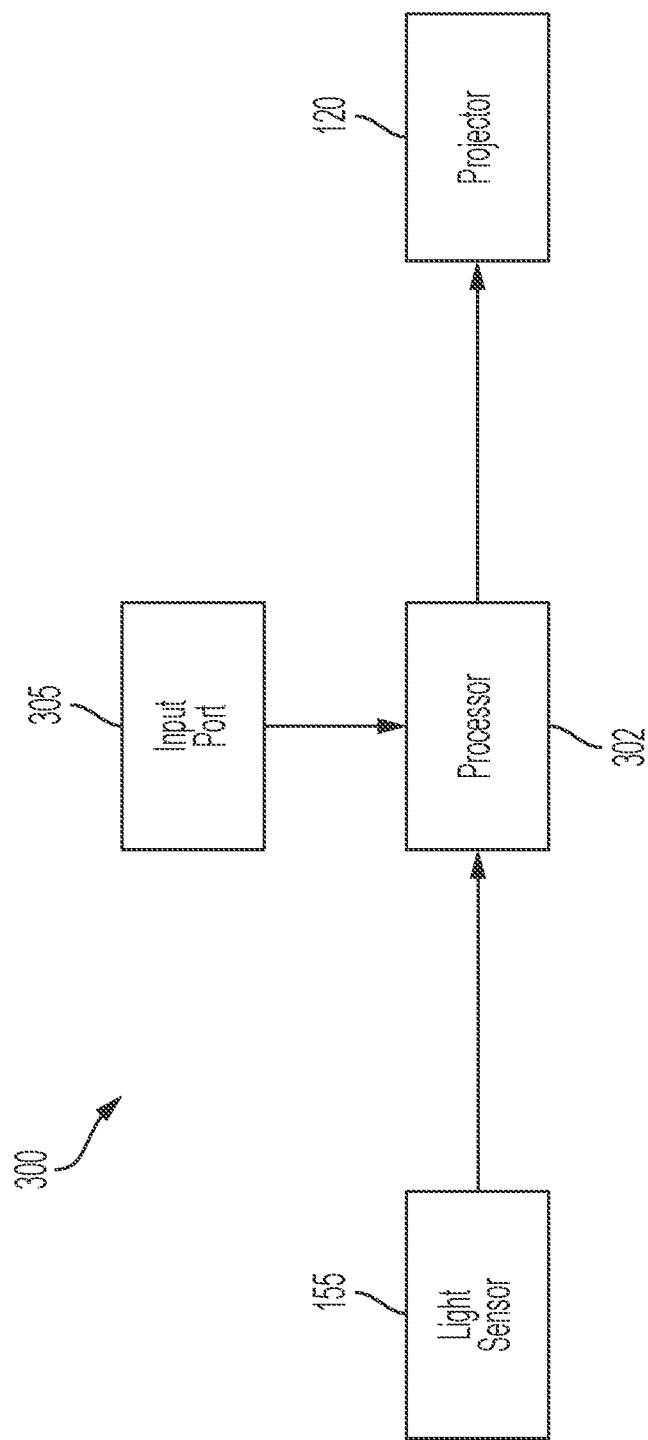
FIG. 3 is a schematic of an example of a control system for controlling projector output according to one aspect of the present disclosure.

FIG. 3 is a schematic of an example of a control system 300 for controlling projector output according to one aspect of the present disclosure. The projector output light level can be controlled based on input from a light sensor 155, An unsafe threshold light level can be provided to a processor 302 via an input port 305. The light sensor 155 can measure the light level on the screen as seen by the viewer.

The processor 302 can store the measured light level and use the measured light level together with the unsafe threshold light level to determine if the projected output light level needs to be adjusted. The processor 302 can determine the projector output light level should be adjusted if the projected output light level is less than the unsafe threshold light level. The processor 302 can communicate to the projector 120 the adjustment information. Additionally, the processor 302 can determine the projected output light level should be adjusted if the measured light level from the light sensor 155 exceeds the unsafe threshold light level. The projected output light level can also be increased to compensate for screen dust increases over time. As a result, the projected output light level at the light hazard zone boundary can increase. At some point during the increases of light level, the projected output light level at the light hazard zone boundary reaches the maximum level allowed for safe operation at the given structure position. At this point, the projected output light level from the projector 120 can be stopped from increasing further.

The projected output light level of concern from a light hazard perspective is the light at the light hazard zone boundary looking back to the point of projection. A sensor positioned at the light hazard zone boundary would be in the projected light path and its shadow would appear on the screen as well. Additionally, the sensor would be visible to theatre patrons seated beside the light hazard zone. As a result, alternative methods that do not interfere with the projected light are needed to determine the projected output light level at the hazardous and non-hazardous boundary.

In some examples, current screen gain data can be input into processor 302 via the input port 305 to determine the projected output light level at the hazardous and the non-hazardous boundary. By inputting the current screen gain, the processor 302 can determine the light level incident on the screen using the reflected light level measured by the light sensor 155 and the screen gain data. Based on the position of the screen with respect to the projection point and the structure position in the light path, the light level at the light hazard boundary can be determined.

In some examples, the screen gain degradation caused by dust can be modeled to determine the screen gain after a period of time from when the screen gain was known. The screen gain modeling parameters can be input into the processor 302 via the input port 305. The model may be different for different theatres, or the model may not consider local effects such as nearby construction that can result in increased dust levels. Local theatre screen gain degradation modelling can be determined by collecting in-theatre data such as humidity, temperature, and particle size, particle count data, or any combination of these. Correlating this data with screen gain readings over time can allow for prediction of screen gain performance at a future date.

Such a monitoring system can be set up with a sensing unit mounted in a projection booth or in a theatre auditorium. The monitoring system can communicate with the processor 302 via an input port 305 to provide the measured data. A sensing device, such as sensor devices 170 or 175 in FIGS. 1 and 2, of the sensing unit can measure light on the screen to determine screen gain. The sensor devices 170 and 175 can be light sensors or cameras placed in the theatre auditorium or the projection booth. A calibrated reference light source can be used to measure the screen gain. The calibrated reference light source can be part of the sensing device or a separate light source. The light sensing device can communicate with the processor 302 via input port 305 to communicate the light measurements and determine screen gain. In some examples, one or more of the sensor devices 170, 175 can alternatively or additionally be a dust-measuring sensor that can detect a level of dust in the theatre.

The approach described above for modelling screen gain degradation can be theatre-specific. However, there can be similarities between theatres located in similar outdoor environments that lead to similar screen gain degradation. For example, theatre screens in cities with similar city pollution levels may have similar screen degradation rates, hence screen degradation models of these theatres may be the same. The number of screen-gain-degradation models to be specified can be limited by classifying theatre screen-gain degradation into different groups of degradation. To ensure accuracy of the model being applied at the theatre is sufficient over time, periodic manual screen gain measurements can be done at a time of maintenance. This can provide an opportunity to adjust the model, if needed.

In some examples, the particle or dust level trend in a theatre or projection booth can be monitored over time. The projected light output can be increased based on the measured particle levels over time. This approach can capture any one-time occurrence of increased dust levels in a short time period as dust level data. The increases in dust levels can be caused by nearby construction or an outside phenomenon such as a sandstorm or wildfires in the area or an issue with the facility air filtering system. Short time periods can be periods lasting a day or days or weeks or months. Alternatively, the particle levels represented by dust level data over time can be monitored and the monitoring system can issue a notification when the cumulative particle level, represented by a dust level trend, reaches a pre-set level (e.g., a threshold condition) or increases by a pre-set amount. The monitoring system can issue a notification to the processor 302 via the input port 305 to initiate arrangements for mitigation operations (e.g., having the screen cleaned). Additionally, if particle levels are abnormally high over a short period of time, the notification can be issued by the monitoring system to allow further action to be taken. An example of a further action can be replacing the facility air filter with a new filter or with a different type of filter that may provide more effective particle removing results.

In some examples, the light level incident on the screen can be measured at the screen with the light sensor 155 looking back at the point of projection. Assuming the light sensor 155 is small enough, the light sensor 155 can be placed at or near a screen edge so that it is not noticeable to the viewer. The direct light measurement can be communicated to the processor 302. The light level at the light hazard boundary can be determined based on the light level incident on the screen, the projection light path geometry, and the position of the structure in the light path.

In some examples, the light level output of the projector can be measured indirectly. For example, the light sensor 155 can be positioned at a light dump location within the projector or at another location to measure the light level output of the projector. The light measured can be sent to the processor 302 and scaled to correspond to the projector output light level. The scaling can be based on the light path geometry in the theatre and the position of the barrier structure in the projected light path. The projector output level can be used to determine the light level at the light hazard boundary.

In some examples, the light degradation of the light source can be modeled based on light output reference data from a known projected light level. The projected light level reference data can be the projected light level data corresponding to input electrical power data at the time when the system was first installed or first tested. The light degradation model parameters and the projected light reference data can be provided to the processor 302 via the input port 305. The projected output light level can be determined based on the light source degradation model, the projected light level reference data, and a run time since collecting the projected light level reference data.

Increasing the light source input power to compensate for light source degradation may not result in more light outputted and therefore may not contribute to increasing the light level at the light hazard boundary. The screen degradation can be a slower degradation process and may not require as much light source input power increases as required to compensate for degradation of the light source. For a theatre with a screen experiencing gradual dusting degradation, updated screen gain data can be provided to the processor 302 via the input port 305 at predetermined intervals (e.g., once or twice in a year).

To prevent a user from adjusting the projector output light in a way that causes the light level between the hazardous light area and the non-hazardous light area to crossover into an unsafe threshold light level, the projector output light level user adjustment can be inhibited or disabled. The projector can automatically increase the output light level to achieve a targeted performance light level or to stay under or at the unsafe threshold light level between the hazardous light area and the non-hazardous light area. The targeted performance light level can correspond to a target light level for the viewer of the screen. This adjustment can be made at time of the daily projector power up when a light level calibration process is initiated. The processor 302 can control projector light level increases and prevention of further light level increases. The processor 302 can also determine adjustments to the light level by keeping a portion of the projected light that is accessible by a viewer under a safe threshold level.

In some examples, projectors may direct more light to be projected in a portion of the projection light path. The projectors can direct light to be projected such that the light level in the portion of the projection light path that is accessible by a theatre patron is not increased or kept under the unsafe threshold light level between the hazardous light area and the non-hazardous light area. Alternatively, the position of the structure between the non-hazardous light area and the hazardous light area can be adjusted to be further from the point of projection to accommodate the degree by which the light level can be increased in the portion of the projection light path.

In another example, projectors can direct light such that the light level in the portion of the projection path that is accessible by a theatre patron is kept under the unsafe threshold light level. In another example, projectors can direct light to be projected such that the light level in the portion of the projected light path that is within a certain distance, such as 3 meters or less, of the seating area floor beneath the projected light path is kept under the unsafe threshold light level.

By configuring a projector that can project high levels of light (e.g., laser projector) as described above, the extent to which the structure between the hazardous light level area and the non-hazardous light level area extends from the point of projection into the theatre can be reduced. As a result, the number of seats that may need to be disabled with a barrier structure can be reduced.

Figure 4:
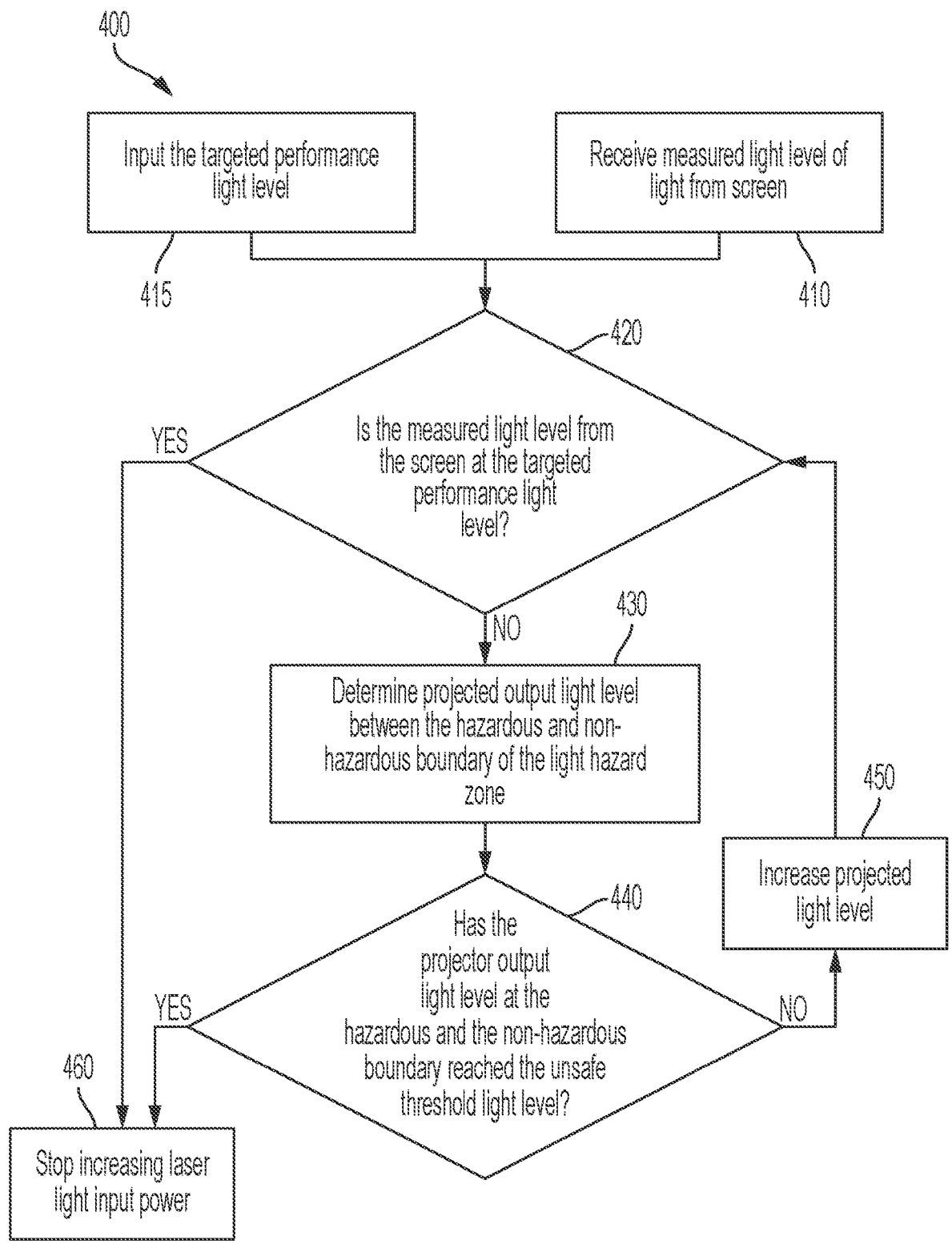
FIG. 4 is a flow chart of an example of a process for adjusting projected light according to one aspect of the present disclosure.

FIG. 4 is a flow chart of an example of a process 400 for adjusting projected light according to one aspect of the present disclosure. In some examples, the processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

At block 415, the processor 302 receives a targeted performance light level. The targeted performance light level can be a light level on a screen. The processor 302 can receive the targeted performance light level through an input port 305.

At block 410, the processor 302 receives a measured light level of light from the screen. The measured light level can represent what a viewer would see of the projected light. A light sensor 155 can determine the measured light level. The light sensor 155 can send the measured light level to the processor 302.

At block 420, the processor 302 compares the measured light level to the targeted performance light level. The processor 302 can determine if the measured light level of viewing the screen has reached the targeted performance light level. If the processor 302 determines the measured light level from the screen is at the targeted performance light level, the processor 302 proceeds to block 460. If the processor 302 determines the measured light level from the screen is not at the targeted performance light level, the processor 302 proceeds to block 430.

At block 430, the processor 302 determines a projected output light level between the hazardous and non-hazardous boundary of the light hazard zone. The projected output light level can be determined based on the measured light level and the position of a structure positioned between a hazardous area and a non-hazardous area in the theatre or the portion of light projected onto the screen that is a non-hazardous area above the seating area. Screen gain data, particle level measurements, light level measurements of light incident on the screen, indirect measurements of the light level output of a projector 120 (which may include laser diode degradation data), models of the light degradation of the light source, or any combination of these may be used to determine the projected output light level at the hazardous and non-hazardous boundary location or at the barrier structure. The measurements or data can be input to the processor 302 via the input port 305.

In one example, determining the projected output light level can include measuring the light level a viewer would see when looking at the screen and using screen gain data to determine the projected light level incident on the screen or projected at the projector knowing the screen and projector placement geometry. In another example, particle level measurement data may be used to model the change in screen gain over time. The model may be used to determine the projected output light level when measuring the light level a viewer may see. The projected output light level over time may also be determined using laser diode degradation data and a model based on an initial projected light output measurement made at a known time of the projected output light level. The initial projected output light level may be indirectly measured from a location that is not in the direct projection light path but can be scaled to indicate the projected output light level, such as within the projector. For example, the projected output light level can be determined at the structure position or at a hazardous and non-hazardous boundary location by using the geometry of the projector position with respect to the screen and the geometry of the projection light path.

At block 440, the processor 302 determines if the projected output light level at the hazardous and the non-hazardous boundary has reached an unsafe threshold light level. The unsafe threshold light level can be based on a light level considered to be hazardous to the eye when viewing the light directly from the projector 120. The processor 302 can compare the projected output light level to the unsafe threshold light level. If the projector output light level at the structure between the hazardous area and the non-hazardous area has reached the unsafe threshold light level, the processor 302 proceeds to block 460. If the projected output light level at the hazardous and the non-hazardous boundary has not reached the unsafe threshold light level, the processor 302 can increase projected light levels in block 450, and return to block 420.

At block 460, the processor 302 stops increasing laser light input power to prevent a projected light level increase. The processor 302 stops increasing the laser light input power after determining that the measured light level is at the targeted performance light level or that the projector output light level has reached the unsafe threshold light level.

In some examples, the measured light level can be compared to a threshold light level that is based on a position of the structure in the theatre to determine a safety score for the light level. The safety score can present a relative assessment of the safety of the measured light level for a particular theatre configuration. And, whether to adjust the light level of light projected by the laser projector can be determined based on the comparison to the safety score.

While the present subject matter has been described in detail with respect to specific aspects thereof, it will be appreciated that those skilled in the art, upon attaining an understanding of the foregoing, may readily produce alterations to, combinations of, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A system comprising:
a projector subsystem with a high power light source positionable in a theatre to project light toward a screen in the theatre such that there is (i) a hazardous light area, (ii) a non-hazardous light area in which an audience seating area is located, and (iii) a boundary region between the hazardous light area and the non-hazardous light area;
a sensor configured to measure a light level of the light projected toward the screen;

a processing device that includes a processor and a non-transitory computer-readable medium having code stored thereon that is executable by the processor to perform operations comprising:
  receiving, from the sensor, a measured light level of light projected by the projector subsystem, wherein the measured light level represents what a viewer would see of the projected light;
  determining a second light level of the boundary region based on the measured light level, screen gain data associated with the screen, and position of the light projected toward the screen over the audience seating area of the theatre;
  comparing the second light level to an unsafe threshold light level; and
  based on comparing the second light level to the unsafe threshold light level, determining a configuration for the system such that the light level of light projected by the projector subsystem into the non-hazardous light area is less than the unsafe threshold light level.

2. The system of claim 1, wherein the high power light source comprises a laser light source.

3. The system of claim 1, wherein the projector subsystem is configured to redirect a first portion of light to a portion of a cross-sectional area of a projected light path, wherein the first portion of light has a light level that is greater than a light level of a second portion of light that the projector subsystem is configured to project to be accessible by the viewer.

4. The system of claim 1, wherein the sensor is configured to measure a light level of a portion of light projected by the projector subsystem that is accessible by the viewer.

5. The system of claim 1, wherein the sensor is configured to measure a light level of a portion of light projected by the projector subsystem that is within three meters of a floor within the audience seating area.

6. The system of claim 1, wherein the code is executable by the processor to determine an adjustment to the light level by keeping a portion of the projected light that is accessible by the viewer under a safe threshold light level.

7. The system of claim 1, wherein the code is executable by the processor to determine an adjustment to the light level by keeping a portion of the projected light that is within a height of three meters from a floor of the audience seating area under the unsafe threshold light level.

8. The system of claim 1, wherein the code is executable by the processor to perform further operations comprising preventing a projected light level increase when (i) the measured light level reaches a performance threshold light level or (ii) the second light level reaches the unsafe threshold light level.

9. The system in claim 1, wherein the code is executable by the processor to perform further operations comprising increasing the light level projected by the projector subsystem until (i) a performance threshold light level or (ii) the unsafe threshold light level is reached.

10. The system of claim 1, wherein the code is executable by the processor to perform further operations comprising:
  receiving laser diode degradation data and light level reference data for determining the second light level; and
  receiving measured light level that corresponds with the projected light level for determining the second light level.

11. The system of claim 10, wherein the measured light level is within the projector subsystem.

12. The system of claim 1, wherein a reserve capacity of output light of the projector subsystem is greater than 20%.

13. The system of claim 1, wherein a reserve capacity of output light of the projector subsystem is greater than 50%.

14. The system of claim 1, wherein the code is executable by the processor to perform further operations comprising inhibiting a light output adjustment to prevent user adjustment of projected light output.

15. The system of claim 1, further comprising a dust-measuring sensor to provide dust level data to determine a dust level trend usable for (i) adjusting projected light output to compensate for screen gain degradation or (ii) issuing a notification when the dust level trend has reached a threshold condition.

16. The system of claim 1, wherein the theatre includes a structure positioned between the hazardous light area and the non-hazardous light area,
  wherein the operation of determining the second light level of the boundary region based on the measured light level includes determining the second light level based on a position of the structure in the theatre.

17. A theatre comprising:
  a screen;
  an audience-seating area;
  a structure at least partially defining (i) a hazardous light area in the theatre, (ii) a non-hazardous light area that includes at least part of the audience seating area, and (iii) a boundary region between the hazardous light area and the non-hazardous light area;
  a projector subsystem to project light toward the screen;
  a sensor to measure a light level of the light projected toward the screen;
  a processing device that includes a processor and a non-transitory computer-readable medium having code stored thereon that is executable by the processor to perform operations comprising:
    receiving, from the sensor, a measured light level of light projected by the projector subsystem toward the screen, wherein the measured light level represents what a viewer would see of the projected light;
    determining a second light level of the boundary region based on the measured light level, screen gain data associated with the screen, and position of the light projected toward the screen over the audience seating area of the theatre;
    comparing the second light level to an unsafe threshold light level; and
    based on comparing the second light level to the unsafe threshold light level, determining a configuration for the projector subsystem such that the light level of light projected by the projector subsystem into the non-hazardous light area is less than the unsafe threshold light level.

18. The theatre of claim 17, wherein the projector subsystem is configured to redirect a first portion of light to a portion of a cross-sectional area of a projected light path, wherein the first portion of light has a light level that is greater than a light level of a second portion of light that the projector subsystem is configured to project to be accessible by the viewer.

19. The theatre of claim 17, wherein the sensor is configured to measure a light level of a portion of light projected by the projector subsystem that is accessible by the viewer.

20. The theatre of claim 17, wherein the sensor is configured to measure a light level of a portion of light projected by the projector subsystem that is within three meters of a floor within the audience seating area.

21. The theatre of claim 17, wherein the code is executable by the processor to perform further operations comprising preventing a projected light level increase when (i) the measured light level reaches a performance threshold light level or (ii) the second light level reaches the unsafe threshold light level.

22. The theatre of claim 17, wherein the code is executable by the processor to perform further operations comprising increasing the light level projected by the projector subsystem until (i) a performance threshold light level or (ii) the unsafe threshold light level is reached.

23. The theatre of claim 17, wherein the code is executable by the processor to perform further operations comprising:
receiving laser diode degradation data and light level reference data for determining the second light level; and
receiving measured light level that corresponds with the projected light level for determining the second light level.

24. The theatre of claim 17, further comprising a dust-measuring sensor to provide dust level data to determine a dust level trend usable for (i) adjusting projected light output to compensate for screen gain degradation or (ii) issuing a notification when the dust level trend has reached a threshold condition.

25. A method comprising:
projecting, by a projector subsystem in a theatre, light toward a screen in the theatre in which a structure is positioned between (i) a hazardous light area, (ii) a non-hazardous light area in which an audience seating area is located, and (iii) a boundary region between the hazardous light area and the non-hazardous light area;
measuring, by a sensor in the theatre, a light level of the light projected toward the screen;
receiving, by a processing device and from the sensor, a measured light level of light projected by the projector subsystem toward the screen, wherein the measured light level represents what a viewer would see of the projected light;
determining, by the processing device, a second light level of the boundary region based on the measured light level, screen gain data associated with the screen, and position of the light projected toward the screen over the audience seating area of the theatre;
comparing, by the processing device, the second light level to an unsafe threshold light level; and
determining, by the processing device and based on comparing the second light level to the unsafe threshold light level, a configuration for the projector subsystem such that the light level of light projected by the projector subsystem into the non-hazardous light area is less than the unsafe threshold light level.

26. The method of claim 25, further comprising determining, by the processing device, an adjustment to the light level by keeping a portion of the projected light that is accessible by the viewer under a safe threshold light level.

27. The method of claim 25, further comprising determining, by the processing device, an adjustment to the light level by keeping a portion of the projected light that is within a height of three meters from a floor of the audience seating area under the unsafe threshold light level.

28. The method of claim 25, further comprising preventing, by the processing device, a projected light level increase when (i) the measured light level reaches a performance threshold light level or (ii) the second light level reaches the unsafe threshold light level.

29. The method of claim 25, further comprising increasing, by the processing device, the light level projected by the projector subsystem until (i) a performance threshold light level or (ii) the unsafe threshold light level is reached.

30. The method of claim 25, further comprising:
receiving, by the processing device, laser diode degradation data and light level reference data for determining the second light level; and
receiving, by the processing device, measured light level that corresponds with the projected light level for determining the second light level.

31. The method of claim 25, further comprising inhibiting, by the processing device, a light output adjustment to prevent user adjustment of projected light output.

* * * * *